US009974142B2

(12) United States Patent
Dunn et al.

(10) Patent No.: US 9,974,142 B2
(45) Date of Patent: *May 15, 2018

(54) SYSTEM AND METHOD FOR DYNAMIC LOAD SHARING BETWEEN ELECTRONIC DISPLAYS

(71) Applicant: Manufacturing Resources International, Inc., Alpharetta, GA (US)

(72) Inventors: William Dunn, Alpharetta, GA (US); Jerry Wasinger, Alpharetta, GA (US); Dave Williams, Alpharetta, GA (US); John Schuch, Alpharetta, GA (US)

(73) Assignee: MANUFACTURING RESOURCES INTERNATIONAL, INC., Alpharetta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/068,800

(22) Filed: Mar. 14, 2016

(65) Prior Publication Data

US 2016/0198545 A1 Jul. 7, 2016

Related U.S. Application Data

(63) Continuation of application No. 13/361,305, filed on Jan. 30, 2012, now Pat. No. 9,286,020.
(Continued)

(51) Int. Cl.
*H05B 37/02* (2006.01)
*G06F 3/14* (2006.01)
(Continued)

(52) U.S. Cl.
CPC ....... *H05B 37/0218* (2013.01); *G02F 1/1336* (2013.01); *G06F 3/14* (2013.01);
(Continued)

(58) Field of Classification Search
CPC ............ H05B 37/0218; H05B 33/0896; G02F 1/1336; G02F 1/13452; G01R 1/06788;
(Continued)

(56) References Cited

U.S. PATENT DOCUMENTS 5,631,805 A 5/1997 Bonsall
5,636,101 A 6/1997 Bonsall et al.
(Continued)

FOREIGN PATENT DOCUMENTS

JP 2000-122575 A 4/2000
JP 2000122575 A 4/2000
(Continued)

*Primary Examiner* — Richard Hong
(74) *Attorney, Agent, or Firm* — Standley Law Group LLP

(57) ABSTRACT

An electronic display assembly which allocates power to a plurality of displays without exceeding a maximum current level for the circuit is disclosed. An exemplary system preferably includes an AC current sensor, a power load sharing controller, ambient light sensors for each display, and a brightness controller for each display. A maximum total current draw may be selected. The ambient light contacting each display may be measured and a corresponding desired brightness calculated. Depending on the present amount of current draw, the system determines if the displays can be driven at the desired brightness without exceeding the maximum total current draw. If yes, the displays are driven at their desired brightness. If no, the desired brightness for each display may be slightly reduced to prevent exceeding the maximum total current draw. Thus, as the ambient light varies between the displays, the available power may be shared.

20 Claims, 4 Drawing Sheets

Related U.S. Application Data

(60) Provisional application No. 61/439,085, filed on Feb. 3, 2011.

(51) Int. Cl.
  *G02F 1/1335* (2006.01)
  *H05B 33/08* (2006.01)

(52) U.S. Cl.
  CPC . *H05B 33/0896* (2013.01); *G09G 2320/0626* (2013.01); *G09G 2330/021* (2013.01); *G09G 2354/00* (2013.01); *G09G 2360/144* (2013.01); *G09G 2370/022* (2013.01)

(58) Field of Classification Search
  CPC ........ H01L 27/3248; H02J 9/062; G06F 3/14; G09G 2320/0626; G09G 2330/021; G09G 2354/00; G09G 2360/144; G09G 2370/022
  See application file for complete search history.

(56) References Cited

U.S. PATENT DOCUMENTS

| | | | |
|---|---|---|---|
| 5,640,302 A | 6/1997 | Kikinis | |
| 5,729,289 A | 3/1998 | Etoh | |
| 5,786,801 A | 7/1998 | Ichise | |
| 5,952,992 A | 9/1999 | Helms | |
| 6,144,359 A | 11/2000 | Grave | |
| 6,292,157 B1 | 9/2001 | Greene et al. | |
| 6,330,150 B1 | 12/2001 | Kim | |
| 6,639,790 B2 | 10/2003 | Tsai et al. | |
| 6,812,851 B1 | 11/2004 | Dukach et al. | |
| 6,850,209 B2 | 2/2005 | Mankins et al. | |
| 6,937,258 B2 | 8/2005 | Lim et al. | |
| 6,962,528 B2 | 11/2005 | Yokota | |
| 7,064,672 B2 | 6/2006 | Gothard | |
| 7,092,248 B2 | 8/2006 | Shu | |
| 7,230,659 B2 | 6/2007 | Ha et al. | |
| 7,334,361 B2 | 2/2008 | Schrimpf et al. | |
| 7,339,782 B1 | 3/2008 | Landes et al. | |
| 7,513,830 B2 | 4/2009 | Hajder et al. | |
| 7,518,600 B2 | 4/2009 | Lee | |
| 7,589,958 B2 | 9/2009 | Smith | |
| 7,609,506 B2 | 10/2009 | Aguirre | |
| 7,774,633 B1 | 8/2010 | Harrenstien et al. | |
| 8,102,173 B2 | 1/2012 | Merrow | |
| 8,116,081 B2 | 2/2012 | Crick, Jr. | |
| 8,144,110 B2 | 3/2012 | Huang | |
| 8,310,824 B2 | 11/2012 | Dunn et al. | |
| 8,352,758 B2 | 1/2013 | Atkins | |
| 9,072,166 B2 | 6/2015 | Dunn et al. | |
| 9,286,020 B2 | 3/2016 | Dunn et al. | |
| 9,313,447 B2 | 4/2016 | Dunn et al. | |
| 9,451,060 B1 | 9/2016 | Bowers et al. | |
| 9,516,485 B1 | 12/2016 | Bowers et al. | |
| 9,578,273 B2 | 2/2017 | Dunn et al. | |
| 9,622,392 B1 | 4/2017 | Bowers et al. | |
| 9,648,270 B2 | 5/2017 | Williams et al. | |
| 2001/0043290 A1 | 11/2001 | Yamamoto | |
| 2002/0112026 A1 | 8/2002 | Fridman et al. | |
| 2002/0140651 A1 | 10/2002 | Lim et al. | |
| 2002/0164962 A1 | 11/2002 | Mankins et al. | |
| 2002/0186333 A1 | 12/2002 | Ha et al. | |
| 2003/0039094 A1 | 2/2003 | Sarkinen et al. | |
| 2003/0204342 A1* | 10/2003 | Law | G01R 1/06788 702/65 |
| 2004/0036697 A1 | 2/2004 | Kim et al. | |
| 2004/0257492 A1 | 12/2004 | Mai et al. | |
| 2005/0007500 A1 | 1/2005 | Lin et al. | |
| 2005/0073518 A1 | 4/2005 | Bontempi | |
| 2005/0162822 A1 | 7/2005 | Shu | |
| 2005/0202879 A1 | 9/2005 | Hussaini et al. | |
| 2005/0231457 A1 | 10/2005 | Yamamoto et al. | |
| 2006/0103299 A1* | 5/2006 | Kwok | H01L 27/3248 313/506 |
| 2006/0215421 A1 | 9/2006 | Chang et al. | |
| 2006/0218828 A1 | 10/2006 | Schrimpf et al. | |
| 2006/0238531 A1 | 10/2006 | Wang | |
| 2006/0292931 A1 | 12/2006 | Tokuda | |
| 2007/0267554 A1 | 11/2007 | Tannas, Jr. | |
| 2008/0002350 A1 | 1/2008 | Farrugia | |
| 2008/0018584 A1 | 1/2008 | Park et al. | |
| 2008/0024268 A1 | 1/2008 | Wong et al. | |
| 2008/0055297 A1 | 3/2008 | Park | |
| 2008/0084166 A1* | 4/2008 | Tsai | G02F 1/13452 315/160 |
| 2008/0143187 A1* | 6/2008 | Hoekstra | H02J 9/062 307/66 |
| 2008/0304219 A1 | 12/2008 | Chen | |
| 2009/0009997 A1 | 1/2009 | Sanfilippo et al. | |
| 2009/0102744 A1 | 4/2009 | Ram | |
| 2009/0104989 A1 | 4/2009 | Williams et al. | |
| 2009/0310066 A1 | 12/2009 | Schuch et al. | |
| 2011/0013367 A1 | 1/2011 | Williams et al. | |
| 2011/0019348 A1 | 1/2011 | Kludt et al. | |
| 2011/0231676 A1 | 9/2011 | Atkins | |
| 2011/0260534 A1 | 10/2011 | Rozman | |
| 2011/0302440 A1* | 12/2011 | DiMarco et al. | G06F 1/26 713/340 |

FOREIGN PATENT DOCUMENTS

| | | |
|---|---|---|
| JP | 2006145890 A | 6/2006 |
| JP | 2007087662 A | 4/2007 |
| JP | 2008046435 A | 2/2008 |
| KR | 20000021499 A | 4/2000 |
| KR | 20020072633 A | 9/2002 |
| KR | 20030088786 A | 11/2003 |
| KR | 20050023882 A | 3/2005 |
| KR | 1020060030424 | 4/2006 |
| KR | 20070070711 A | 7/2007 |
| KR | 20080000144 A | 1/2008 |
| KR | 20080029114 A | 4/2008 |
| KR | 1020080046335 A | 5/2008 |
| WO | 2008-050402 A1 | 5/2008 |
| WO | WO2008050402 A | 5/2008 |
| WO | WO2009152310 A3 | 12/2009 |
| WO | WO2010059930 A3 | 5/2010 |
| WO | WO2010081011 A | 7/2010 |

* cited by examiner

SYSTEM AND METHOD FOR DYNAMIC LOAD SHARING BETWEEN ELECTRONIC DISPLAYS

CROSS-REFERENCE TO RELATED APPLICATIONS

This application is a continuation of U.S. application Ser. No. 13/361,305, filed on Jan. 30, 2012, now U.S. Pat. No. 9,286,020, issued on Mar. 15, 2016. U.S. application Ser. No. 13/361,305 is a non-provisional application of U.S. Application No. 61/439,085 filed on Feb. 3, 2011. All aforementioned applications are hereby incorporated by reference in their entirety as if fully cited herein.

TECHNICAL FIELD

Embodiments generally relate to a system and method for allocating power to a plurality of displays on a single AC circuit while controlling the power consumption of the displays.

BACKGROUND OF THE ART

Electronic displays are now being installed throughout public sites for a number of different reasons (advertising, information, entertainment, menu boards, ticket counters, etc.). Of course, while installing electronic displays at public sites there must be adequate power present to drive the electronic displays. In some applications, multiple displays may be installed at a single location and it may not be feasible or desirable to establish individual circuits for each electronic display. Thus, it is now desirable for multiple electronic displays to share a single AC circuit.

However, when displays are used at public sites, especially outdoor environments or other situations where the ambient light levels are high, the light which is emitted from the display must compete with the amount of ambient light in the present environment. Thus, the displays may be required to produce a large amount of light in order to provide adequate picture quality for the environment. When multiple displays are installed on a single AC circuit, the ability for each display to produce large amounts of light (and draw large amounts of current) is limited by the maximum current level of the AC circuit. In many applications, the AC circuits being used for the displays are in areas where the AC circuit's maximum current may be on the order of 20 Amps.

It is typically undesirable to allow the installed displays to exceed the maximum current allowed by the AC circuit as this can typically lead to tripped breakers or blown fuses which can be time consuming and costly to reset or replace. Therefore, it is desirable to have multiple displays share a single AC circuit without exceeding the maximum current level allowed by the circuit. In other applications it may be desirable to limit the amount of current drawn by the displays for energy conservation reasons, rather than the limits placed on the circuit itself. Therefore, it is also desirable to group several displays together on a single circuit while limiting their power consumption in an effort to conserve energy.

SUMMARY OF THE EXEMPLARY EMBODIMENTS

Exemplary embodiments include a system and method for dynamically sharing a single AC circuit for a plurality of electronic displays while limiting the power consumption (current draw) of the displays. An exemplary system measures the amount of ambient light contacting each of the display surfaces and allocates power accordingly. As the sun moves across the sky, the solar loading on the various displays may change, allowing the exemplary embodiments to transfer power to the display which requires a higher brightness level. Further, the displays can maintain optimum performance without exceeding the maximum current level for the circuit.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
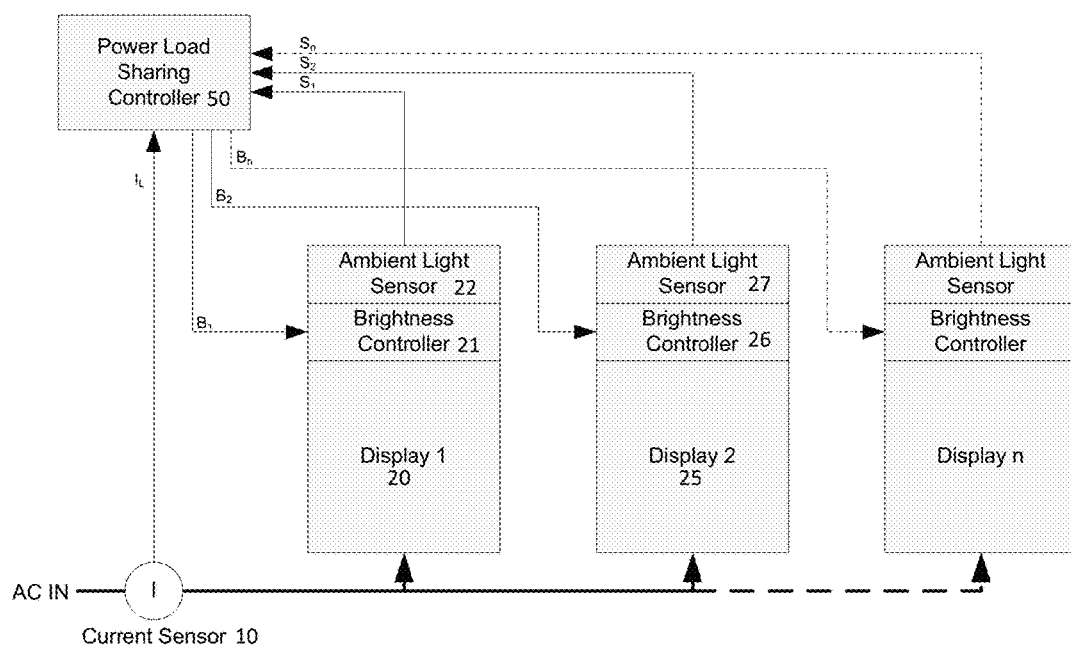
FIG. 1 is a schematic of the basic components for controlling the brightness of several displays in response to ambient light measurements and total current draw.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic of the basic components for controlling the brightness of several displays in response to ambient light measurements and total current draw. The incoming power from the AC circuit is preferably measured using a current sensor 10, where this measurement (IL) is sent to a power load sharing controller 50. The incoming power is preferably distributed to each display on the circuit; here display 20, display 25, and display n (representing any number of additional displays that may be connected to the AC circuit). Each display preferably has similar components, so the components for each display will now be described with respect to display 20. Preferably, display 20 is equipped with a brightness controller 21 which controls the brightness level for display 20. Also preferably, display 20 is also equipped with an ambient light sensor 22 which is placed to measure the amount of ambient light that is contacting the display 20, preferably the amount of ambient light that is contacting the image-producing face of the display 20. Once the ambient light level has been measured, the resulting data (S1) is transmitted to the power load sharing controller 50 for analysis. As shown in the figure, the power load sharing controller 50 is preferably in electrical communication with the current sensor 10, ambient light sensor 22, and the brightness controller 21.

The power load sharing controller 50 may be any commercially available software driver/processor, control system, or microcontroller. The power load sharing controller 50 may analyze the incoming data from the current sensor 10 and ambient light sensors to produce a brightness setting ($B_n$) for each display, and sends $B_n$ to the brightness controller 21. In an exemplary embodiment, the brightness controller 21 may be a circuit card assembly with an onboard microcontroller running embedded software. In a further embodiment, the brightness controller could be a pulse-width modulator (PWM), analog voltage, or a value sent to a backlight or display brightness control chip. In general, the brightness controller 21 accepts $B_n$ for the display and then drives the display to accommodate the brightness setting $B_n$.

Figure 2:
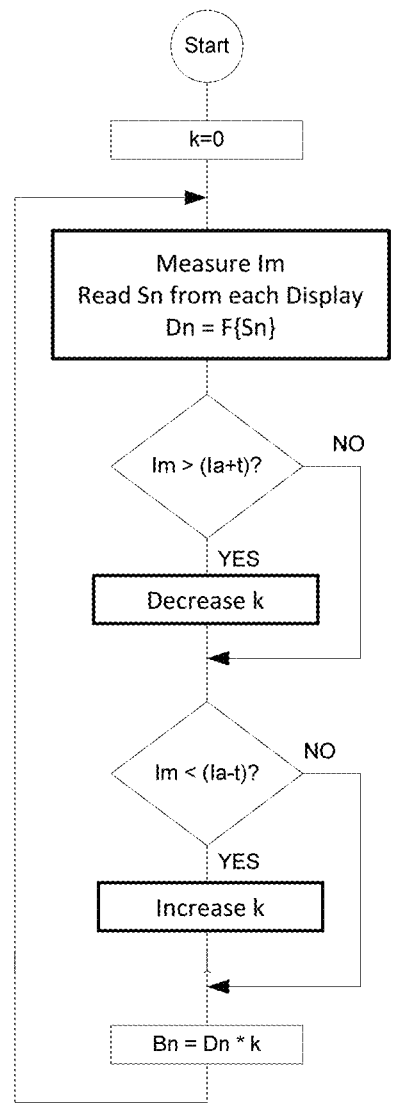
FIG. 2 is a flow chart showing one embodiment of the logic for controlling the brightness of several displays in response to ambient light measurements and total current draw.

FIG. 2 is a flow chart showing one embodiment of the logic for controlling the brightness of several displays in response to ambient light measurements and total current draw. In general terms, an exemplary system asks each display how bright they would like to be, depending on the measurements coming from the ambient light sensors. The system would then determine the amount of current being used by the displays at the present time, and decide whether the displays may be driven at their desired brightness without exceeding the maximum current allowed by the circuit. If yes, each display is given the amount of power necessary to achieve their desired brightness. If no, the amount of power sent to the displays is reduced such that the maximum allowable current is utilized without overloading the circuit. Any embodiment which achieves these general guidelines would fall within the scope of the invention.

Specifically referring to the embodiment shown in FIG. 2, the various terms are used to represent the following:

Im—total measured line current running to all displays.

Ic—maximum allowed current from the electrical circuit.

Ia—maximum allowed current. May be set for each application, but should preferably be less than Ic.

t—tolerance of Ia. This tolerance is optional, and may be set at any value for the particular system. The selection of t may depend upon the refresh rate of the system, speed of the processor/sensors, as well as other operational parameters.

Sn—Ambient Light Sensor value from each display.

F{Sn}—display-specific function that converts Sn to desired brightness. This may be a linear function, non-linear function, or a basic lookup table.

Dn—desired brightness setting for each display. Dn=F{Sn}.

k—common derating value applied to each display's desired brightness value. This value can vary anywhere between a selected min/max and the precise amount to increase/decrease k may be the result of a linear function, non-linear function, constant increment, or a basic lookup table. Here, for explanatory purposes, the values can vary anywhere between 0 and 1, and are incrementally increased/decreased by a pre-selected Δk.

Bn—Brightness setting for each display. Bn=k*Dn.

This embodiment begins by setting k=0 and reading the data from the current sensor (Im) and ambient light sensors (Sn). The desired brightness for each display is preferably calculated as Dn=F{Sn}. At this point, the total current (Im) is compared to the maximum allowable current plus an optional tolerance value (Ia+t). If higher, k is decreased. If lower, no action is taken. The system then preferably compares the total current (Im) to the maximum allowable current minus an optional tolerance value (Ia−t). If less, k is increased. If greater, no action is taken. The brightness setting (Bn) for each display is then calculated and sent to each display as Bn=Dn*k. With these new brightness settings, the system then returns to the beginning of the loop and reads the data from the current sensor (Im) and ambient light sensors (Sn).

Thus, in this embodiment, k is used to control the relative amount of current that is sent to each display. Here, if k=1 each display receives the entire amount of current that is desired by each display. Further, if k=0.5 each display receives roughly half of the amount of current that is desired by the display. In this embodiment, because k begins at 0, at startup each display begins dark and slowly increases in power while ensuring that the total current draw does not exceed the maximum current level for the circuit. The amount that k is increased/decreased each time can be driven by a linear function, non-linear function, constant increment, or basic lookup table.

Figure 3:
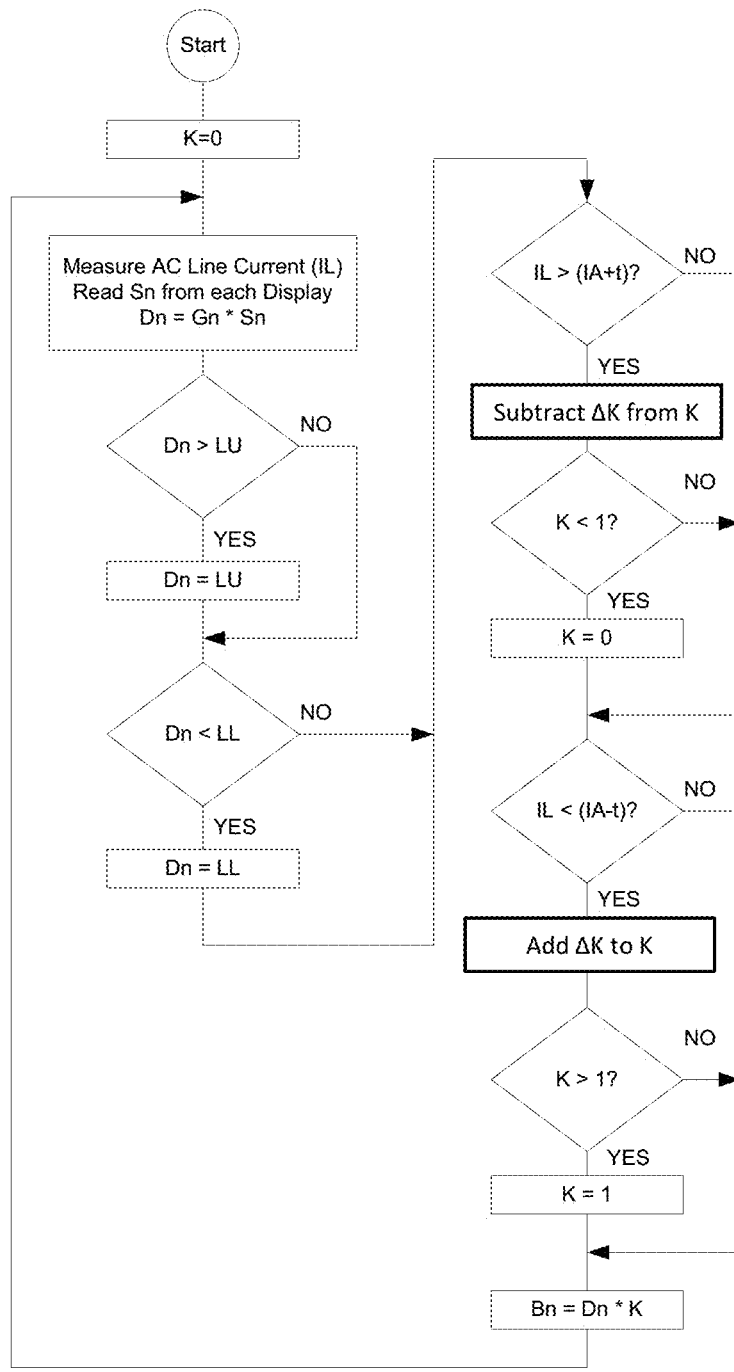
FIG. 3 is a flow chart showing another embodiment of the logic for controlling the brightness of several displays in response to ambient light measurements and total current draw where optional limit tests are used.

FIG. 3 is a flow chart showing another embodiment of the logic for controlling the brightness of several displays in response to ambient light measurements and total current draw where optional limit tests are used.

For this embodiment, the various terms are used to represent the following:

IL—total measured line current running to all displays.
IC—maximum allowed current from the electrical circuit.
IA—maximum allowed current. Can be set by the end user. In some embodiments, IA is typically 80%-90% of IC.
t—tolerance of IA.
n—subscript that denotes display number.
Sn—Ambient Light Sensor value from each display.
Gn—display-specific constant that converts Sn to desired brightness.
Dn—desired brightness setting for each display. Here, a linear relationship is used: Dn=Gn*Sn.
LU—Upper allowable limit of desired brightness—may be selected for each display or for all displays.
LL—Lower allowable limit of desired brightness—may be selected for each display or for all displays.
K—common derating value applied to each display's desired brightness value. Range is from 0 to 1. Initialized to 0.
ΔK—increment value for K. May be any value that the user desires, in this embodiment ΔK=0.05.

This embodiment begins by setting K=0 and reading the data from the current sensor (IL) and ambient light sensors (Sn). The desired brightness for each display is preferably calculated as Dn=Gn*Sn. In this embodiment, limit tests are then ran to determine if the desired brightness for each display is within the acceptable range between the lower limit (LL) and upper limit (LU). If the desired brightness for any display is greater than the upper limit (LU), the desired brightness for that display is set to the value of the upper limit (LU). If the desired brightness for any display is less than the lower limit (LL), the desired brightness for that display is set to the value of the lower limit (LL).

At this point, the total current (IL) is compared to the maximum allowable current plus a tolerance value (IA+t). If higher, ΔK is subtracted from K and a limit test is ran to determine if K is now less than zero (if so, K is set to zero). If lower, no action is taken. The system then preferably compares the total current (IL) to the maximum allowable current minus a tolerance value (IA−t). If less, ΔK is added to K and may be ran through a limit check to determine if k has now exceeded the max value (here 1); and if so K is set to the max value (here 1). If greater, no action is taken. The brightness setting (Bn) for each display is then calculated and sent to each display as Bn=Dn*K. With these new brightness settings, the system then returns to the beginning of the loop and reads the data from the current sensor (IL) and ambient light sensors (Sn).

Figure 4:
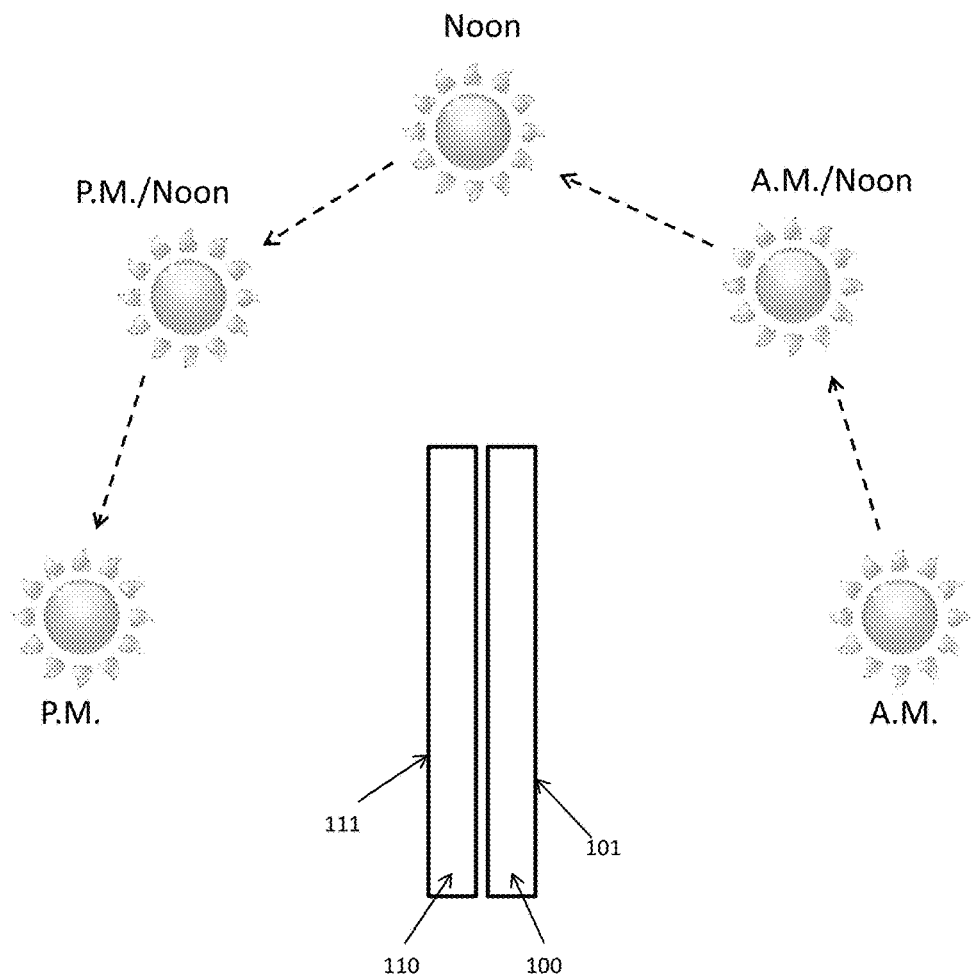
FIG. 4 is an illustration of one exemplary application for the various embodiments of the system and method described herein.

FIG. 4 is an illustration of one exemplary application for the various embodiments of the system and method described herein. In this application, a first display 100 and second display 110 are placed in a back-to-back orientation and share a single AC circuit. Thus, the image-producing surface 101 of the first display 100 faces the opposite direction as the image-producing surface 111 of the second display 110. In this orientation, as the sun passes from sunrise (A.M.) to sunset (P.M.) the solar loading will transfer from the first display 100 to the second display 110. Thus, the first display 100 will require most of the power in the A.M. and A.M./Noon position while the second display 110 will require most of the power in the P.M./Noon and P.M. positions. As each display contains an ambient light sensor, the variance in solar loading on each display is detected and the desired brightness of each display is accordingly adjusted. The system and method described above can be used to allow the displays 100 and 110 to transfer power back and forth depending upon the position of the sun (ambient light measurements) while sharing a single AC circuit without exceeding the maximum current limits for the circuit.

It is to be understood that the spirit and scope of the disclosed embodiments are not limited to any particular type of display. Embodiments may be used in conjunction with any type of electronic display, including but not limited to: LCD, plasma, OLED, light emitting polymer (LEP), and organic electro luminescence (OEL). Furthermore, the various embodiments may be used with displays of other types including those not yet discovered. While the embodiments herein may be used in outdoor environments, they are not limited to such applications. Thus, the embodiments herein may be used in indoor environments as well, where multiple displays must share a single AC circuit.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. An electronic display assembly comprising:
an incoming AC current sensor which measures the total current being drawn from an AC supply circuit;
a common power load sharing controller in electrical connection with the AC current sensor;
a first display in electrical connection with the AC current sensor and having associated therewith:
an ambient light sensor in electrical connection with the common power load sharing controller, and
a brightness controller in electrical connection with the common power load sharing controller; and
a second display in electrical connection with the AC current sensor and having associated therewith:
an ambient light sensor in electrical connection with the common power load sharing controller, and
a brightness controller in electrical connection with the common power load sharing controller.

2. The electronic display assembly of claim 1 wherein:
the common power load sharing controller is adapted to determine the desired brightness for each display based on data from the ambient light sensors.

3. The electronic display assembly of claim 2 wherein:
the common power load sharing controller is further adapted to drive each display at or near the desired brightness level without exceeding a maximum current draw from the AC circuit as measured by the current sensor.

4. The electronic display assembly of claim 1 wherein:
the first and second displays are selected from the group consisting of a liquid crystal display and an OLED display.

5. The electronic display assembly of claim 1 wherein the common power load sharing controller includes:
a microprocessor and memory; and
programming configured to analyze signals from the ambient light sensors, to resultantly determine a brightness setting for each display, and to communicate the brightness level for a given display to the brightness controller associated with that display.

6. The electronic display assembly of claim 1 wherein: the first and second displays are positioned so that they are not co-planar.

7. The electronic display assembly of claim 1 wherein: the first and second displays are positioned so that they are facing opposite directions.

8. The electronic display assembly of claim 1 further comprising:
a third display in electrical connection with the AC current sensor and having
an ambient light sensor in electrical connection with the common power load sharing controller, and
a brightness controller in electrical connection with the common power load sharing controller.

9. An electronic display assembly comprising:
a plurality of electronic displays powered by a single AC circuit, each display having an ambient light sensor positioned to measure ambient light level, and a brightness controller;
an incoming AC current sensor in electrical connection with the AC circuit and configured to measure the total current being drawn from the single AC circuit;
a common power load sharing controller in electrical connection with the AC current sensor, as well as the ambient light sensor and the brightness controller of each electronic display, the common power load sharing controller programmed to allocate available power from the single AC circuit to each electronic display based on an analysis of data received from the ambient light sensors.

10. The electronic display assembly of claim 9 wherein: the common power load sharing controller manages the power sent to the plurality of displays so as not to exceed a maximum current draw from the circuit.

11. The electronic display assembly of claim 9 wherein: the common power load sharing controller allocates more power to electronic displays having higher ambient light measurements and less power to electronic displays having lower ambient light measurements.

12. The electronic display assembly of claim 9 wherein: the common power load sharing controller allocates power to each electronic display corresponding to a desired brightness for the display, while preventing the total current draw from the AC circuit from exceeding a maximum value.

13. The electronic display assembly of claim 9 wherein: the common power load sharing controller accepts a maximum current draw value for the single AC circuit and allocates an amount of power to each display that is related to the amount of ambient light at each display, without exceeding the accepted maximum current draw value.

14. The electronic display assembly of claim 9 wherein: the plurality of electronic displays comprises a pair of electronic displays positioned back to back.

15. An electronic display assembly comprising:
a plurality of electronic displays powered by a single AC circuit, each display having an ambient light sensor positioned to measure the ambient light level near the display and to produce resulting data, and a brightness controller that controls the brightness of the display;
an incoming AC current sensor in electrical connection with the AC circuit and configured to measure the total current being drawn from the single AC circuit;
a common power load sharing controller in electrical connection with the AC current sensor, as well as the ambient light sensor and the brightness controller of each electronic display, the common power and load sharing controller including a microprocessor, memory, and programming configured to:
receive and analyze data from the ambient light sensors,
calculate a brightness setting for each display that will produce a brightness level that is as close as possible to a desired brightness level based on the data from the ambient light sensors, while simultaneously prohibiting the total current draw on the AC circuit from exceeding some maximum value, and
communicate to each brightness controller a calculated brightness level for its associated display.

16. The electronic display assembly of claim 15 wherein: the maximum allowable total current draw on the AC circuit is selectable by a user.

17. The electronic display assembly of claim 15 wherein: the common power load sharing controller is programmed to instruct the brightness controller of each display to drive its display at the desired level of brightness unless the resulting total current draw on the AC circuit would exceed the maximum allowable total current draw.

18. The electronic display assembly of claim 15 wherein: each electronic display has a different position relative to the sun.

19. The electronic display assembly of claim 15 wherein: the plurality of electronic displays comprises a first and second display that are positioned back to back.

20. The electronic display assembly of claim 15 wherein: the common power load sharing controller is programmed to allocate to the brightness controllers less than the amount of power required to drive each display at its calculated desired brightness level if the resulting total current draw on the AC circuit would exceed the maximum allowable current draw.

* * * * *